United States Patent [19]
Grandi

[11] Patent Number: 5,125,328
[45] Date of Patent: Jun. 30, 1992

[54] APPARATUS FOR COOKING AND REFRIGERATING FOOD WITH SELECTIVE INTRODUCTION AND REMOVAL OF FOOD

[76] Inventor: René Grandi, Loudon-Ruy, F-38300 Bourgoin-Jallieu, France

[21] Appl. No.: 548,942
[22] PCT Filed: Feb. 2, 1989
[86] PCT No.: PCT/FR89/00035
 § 371 Date: Aug. 3, 1990
 § 102(e) Date: Aug. 3, 1990
[87] PCT Pub. No.: WO89/06905
 PCT Pub. Date: Aug. 10, 1989

[30] Foreign Application Priority Data
 Feb. 4, 1988 [FR] France .................. 88 01421

[51] Int. Cl.⁵ .................. A47J 37/00; A47J 37/12
[52] U.S. Cl. .................. 99/335; 99/330; 99/355; 99/357; 99/404; 99/407; 99/443 C; 99/470; 126/299 R; 126/299 D
[58] Field of Search .......... 99/407, 403, 443 C, 99/352, 357, 470, 335, 330, 331, 355, 404, 477, 517; 126/299 R, 299 F, 299 D

[56] References Cited

U.S. PATENT DOCUMENTS

| | | | |
|---|---|---|---|
| 1,175,666 | 3/1916 | Taylor | 126/299 R |
| 1,310,495 | 7/1919 | Ford | 99/407 |
| 2,198,645 | 4/1940 | Wolcott | 126/299 R |
| 2,554,694 | 5/1951 | Belt | 126/299 R |
| 3,092,270 | 9/1958 | Slamar et al. | |
| 3,296,954 | 1/1967 | Haub et al. | 99/407 |
| 3,391,689 | 7/1968 | Roger | 126/299 R |
| 3,690,246 | 9/1972 | Guthrie, Sr. | 99/407 |
| 3,797,377 | 3/1974 | Lotter et al. | 99/424 |
| 3,821,925 | 7/1974 | Moore | |
| 3,964,378 | 6/1976 | Dunkelman | 99/446 |
| 4,287,818 | 9/1981 | Moore et al. | 99/411 |
| 4,523,520 | 6/1985 | Hofmann et al. | 99/443 C |

FOREIGN PATENT DOCUMENTS

| | | | |
|---|---|---|---|
| 3503236 | 8/1986 | Fed. Rep. of Germany | 126/299 D |
| 2450672 | 10/1980 | France | |
| 2596250 | 10/1986 | France | |
| 168100 | 8/1959 | Sweden | 99/407 |

OTHER PUBLICATIONS
International Search Report.

Primary Examiner—Timothy F. Simone
Attorney, Agent, or Firm—Sandler, Greenblum, & Bernstein

[57] ABSTRACT

Apparatus for cooking or refrigerating food which is capable of treating several products having different cooking or refrigerating times, wherein baskets containing these products can be separately introduced or removed. The apparatus includes a lower part in which the products are to be treated, and a hood covering the lower part. To allow introduction or removal of baskets, the hood may be raised and lowered by a mechanism. Robot arm secured below the hood slide on transverse endless screws and grasp baskets whose treatment is complete, while permitting other baskets to remain for treatment.

19 Claims, 3 Drawing Sheets

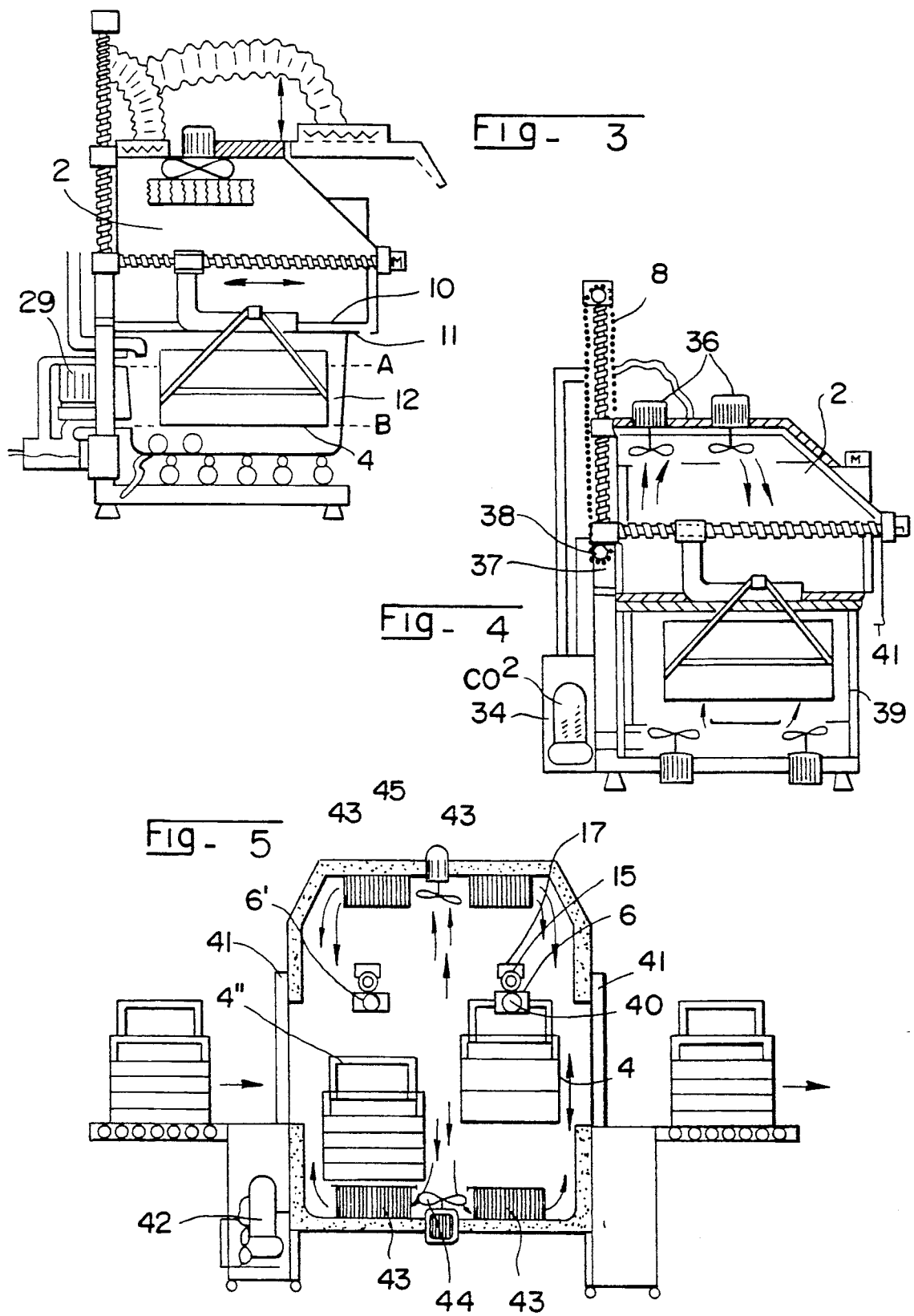

APPARATUS FOR COOKING AND REFRIGERATING FOOD WITH SELECTIVE INTRODUCTION AND REMOVAL OF FOOD

BACKGROUND OF THE INVENTION

1. Field of the Invention

Food preparation devices are known which permit a random selection of the introduction and removal of products contained in boxes, baskets, and other containers for the purposes of cooking and cooling. The introduction and removal of products into and out of these devices are effected by a single robot or automation, making these movements one after the other.

2. Discussion of Background and Relevant Information

For other food preparation devices, the cooking and refrigeration occur in tunnel, where introduction and removal can only be done consecutively, one after another. The principal drawback of these devices is that they do not permit the mixing of products having different treatment times. The products must be treated by cooking family, one after the other. Because, the boxes of products follow each other, they must be removed one after the other. Because of this drawback certain products are either overcooked, or over-refrigerated where an excess of cold destroys all taste quality. In these devices, the loading and unloading of the food containers are performed by a single robot, the operations are slower, and require some waiting.

U.S. Pat. No. 3,821,925 describes a cooking device with introduction and removal of baskets containing the products to be treated. The device is composed of two parts: a lower part, and a cover overlapping this lower part serving to treat the products with heat, the cover being movable to permit the removal and introduction of a basket integrated with said cover and containing the products to be treated. This device, conceived for frying under pressure, does not permit different cooking or cooling times in the same chamber and does not lend itself to the automatization of the introduction and removal operations of the products to be treated.

French Patent Document No. 2,596,250 describes a device intended for cooking alimentary doughs. It includes a cooking container and several sintering boxes receiving the baskets containing the doughs to be cooked. The movement and the length of time for the immersion of each sintering box is automatically controlled. This apparatus has no cover, which does not permit the evacuation of cooking gases leading to mediocre thermal efficiency.

The device described below avoids all of these drawbacks. It consists of two parts: a lower part receiving the products to be treated, and an upper part overhanging the lower part serving as a hood and a cover for it.

For the cooking device, the lower part consists of a vat, or several vats side-by-side. Several types of cooking can be performed: flowing vapor, superheated vapor, pulsating air, slow heat, water immersion, and also cooking in oil, like deep frying.

Several devices can be added in modules, one after the other, and each module has its cover equipped with an autonomous introduction and removal system. This system, for reasons of economy, can be the same for all of the modules.

To permit the introduction and removal of products to be cooked or cooled, the raising and lowering system lifts up the hood-cover with the help of an endless screw, by a chain controlled by an electric drive, by a winder, or by any other method attached to a ramp. The hood-cover is integrated with the raising and lowering system, and in a raised position, it permits the detachment of the hot or cold treatment vat, as well as allowing the introduction and removal of baskets containing the products. These baskets are introduced or removed by a robot arm sliding on an endless transverse screw attached under the hood-cover, raising and lowering with it.

The transverse endless screw allows the introduction of the baskets into the vat, or their removal onto an external conveyor. Several arms motorized and controlled by an exterior console, can exist alongside each other according to the number of vats.

In the vat where the products finish their treatment, the fork of the arm grasps the basket, and the hood-cover goes up, letting the basket be removed outside by the arm sliding on its endless screw. Only the robot arm which receives the command by a switch located on its fork, grasps the basket and removes it. The baskets are not grasped will remain in the finishing end treatment area. To introduce the baskets, a switch placed on the conveyor signals the hood-cover raise, and to the robot arm to seize the basket. Without the basket, the robot arm cannot function.

At the end of the operation a switch on the endless screw of the robot arm will center the basket in the vat. Just as for the raising and lowering of the hood-cover, a control cam controls the opening and closing function of the hood-cover.

In order to permit easy passage of the carrier arm with its fork, taking or putting the basket on the conveyor or even from a cart at a constant level, a guillotine or tilting door, motorized or not, opens simultaneously as the carrier robot arm advances. The conveyor bringing or removing the baskets may or may not be used depending on what is needed.

During the raising of the cover, the skirt slides along the entire periphery of the device to prevent the loss of heat or cold.

A programmable automation controls, activates, or stops all the operations.

Above the guillotine door and the conveyor, a filtering hood evacuates the vapors at the moment the products exit. This hood is attached to a supple conduit and is flexible up to the rear extraction sheath evacuating the cooking vapors.

Using the device with flowing vapor, a control key controls the evacuation of vapors because these are not modulated, they accumulate in the induction hood and are not sufficient to cook the products. For refrigeration purposes extraction sheaths are not necessary.

An air of water condenser allows the recovery of all condensation. An induction ventilator can be provided to evacuate the steam or oil vapors. The condensation waters can be evacuated by an external evacuation, or they can be recycled into the water of the cooking vat, thereby conserving water.

Under the hood-cover, electric super heaters and a turbine superheat the flowing vapors or are used for pulsating air or for dry vapor. The temperature of the super heaters can surpass 120° in order to destroy bacteria and salmonella, which are not destroyed by the simple flowing vapor which is limited to about 99°. This temperature is insufficient to destroy certain bacteria.

For cooking with pulsating air only the super heaters are used, and a turbine serves to agitate this hot air with an induction and output direction.

On the periphery of the hood-cover, and on the periphery of the vat receiving the cover, a joint on each of the two parts permits them to close hermetically, in order to prevent vapors, the heat and the cold from the cooling device from escaping.

For water immersion cooking, a pump recycles the water in the vat to eliminate the amydons and starches, and to remove them at an overflow level A when the vat is too full with water. With flowing vapor, another overflow level B evacuates the excess water, an electrovalve regulates and controls the water level. A general faucet permits the closed vat to be emptied by a valve when cooking by water immersion.

A grease collector located at the exit of the two overflow levels recovers the greases.

Two switches i.e., upper and lower switches determine the overflow levels chosen by the operator.

The cooking vat is heated either by gas or electric burners placed in it.

The same device will be used for cold bonding, that is, very rapid cooling of hot products before their temperature descends below 65°, in order to respect the law, to prevent the growth of bacteria. The device has the same introduction and removal system as the hot one. Refrigeration is assured by a cold compressor, $CO_2$, or liquid nitrogen, with an adequate ventilator distributing the cold evenly in the device. The device can be coupled to the hot one with the same introduction and removal conveyor for the baskets.

Between the two devices, a salamander grill permits the operating agents to sprinkle, decorate, and prepare, the food before the products are introduced into the cold area.

A programmable automation permits, in the cooling device the determination of the cooling time necessary for each product. These products must be cooled in less than two hours according to the law, and the compressor and evaporators must be designed with this in mind.

The cooling device, having products with different treatment times, raises and lowers, and the robot arm effects their operation as in the cooking device.

Each product must be immediately removed after its cooling time has elapsed, in order to preserve all of the taste and aesthetic qualities of the products which are otherwise destroyed by prolonged cold ventilation.

A continuous production line can be envisaged with the cooking and cooling modules following each other in order to effect a coherent operation.

A general programmable automation operates the whole production line.

This device allows the cooking and cooling of products, which have been prepackaged raw and vacuum packed in plastic pouches, with the cooking being done by vapor plus pulsating air. Prepackaged raw products in covered cardboard or aluminum containers can also be treated, these products belonging to the semi-conserved cooking method which is often used in air pulsating ovens, but whose introduction and removal is done manually. When a single product is being cooked or cooled, a single treatment time can be used, contrary to the device which was just described.

BRIEF DESCRIPTION OF THE DRAWINGS

The attached drawings which illustrate the invention are given as non-limiting examples of different embodiments the invention.

FIG. 3 shows the cooking device closed, with the robot arm having deposed the basket for treatment.

FIG. 4 represents the closed device in the refrigeration system.

FIG. 5 shows a side view of the cooling device, in the process of removing a single basket having finished its treatment. The other basket remains, and continuing its refrigeration, the fork of the robot arm not having received the command has not seized the basket.

DETAILED DESCRIPTION OF THE PREFERRED EMBODIMENTS

Figure 1:
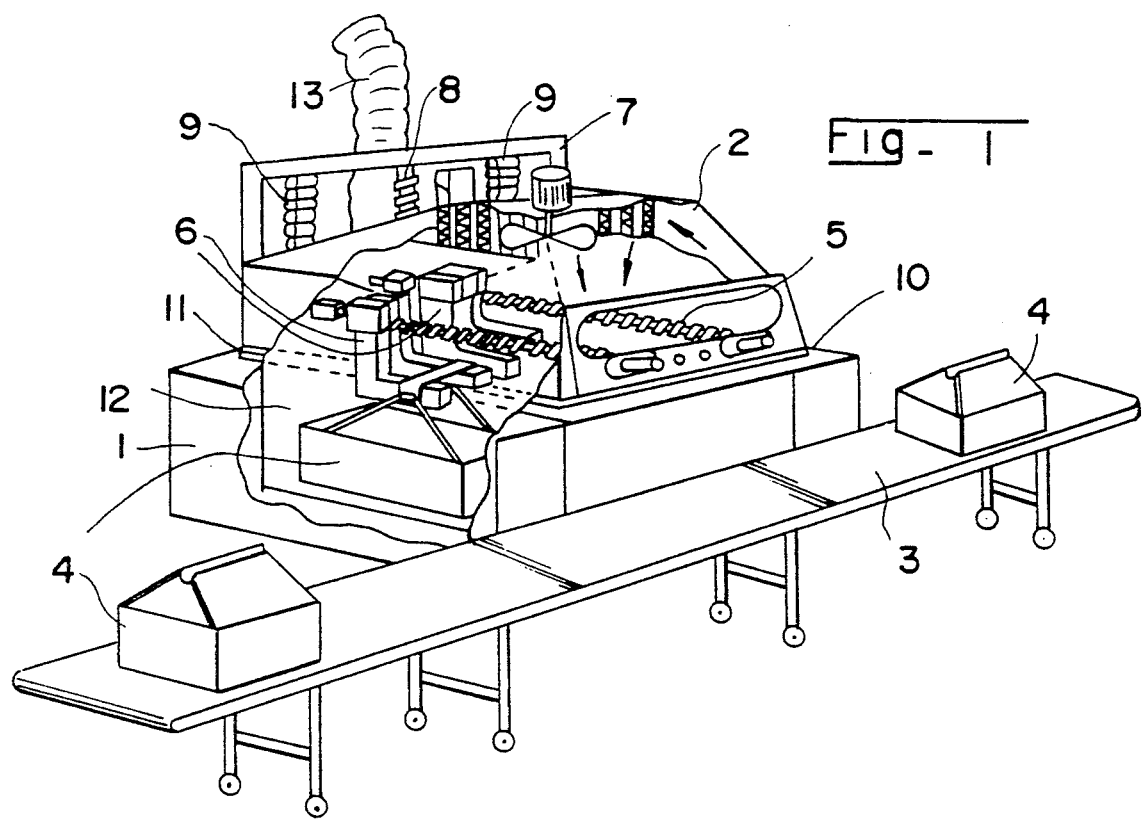
FIG. 1 represents a section in perspective of the closed device, showing the conveyor to bring and remove the baskets. In the cut-away of the device, the robot arms with a basket in the can be seen.

The device represented in FIG. 1 includes a lower part to treat the products 1, and the hood-cover 2 with a conveyor 3 to bring and remove the baskets 4. The cut-away shows the endless screw 15 of the robot arms 6 with a basket 4. A ramp 7 permits the raising of the hood-cover 2 by means of a vertical endless screw 8 or chains 9, the joint 10 of the cover, and the joint 11 of the vat 12 hermetically join the two upper and lower parts. A flexible conduit 13 evacuates the vapor odors and greases released by the different treatments.

Figure 2:
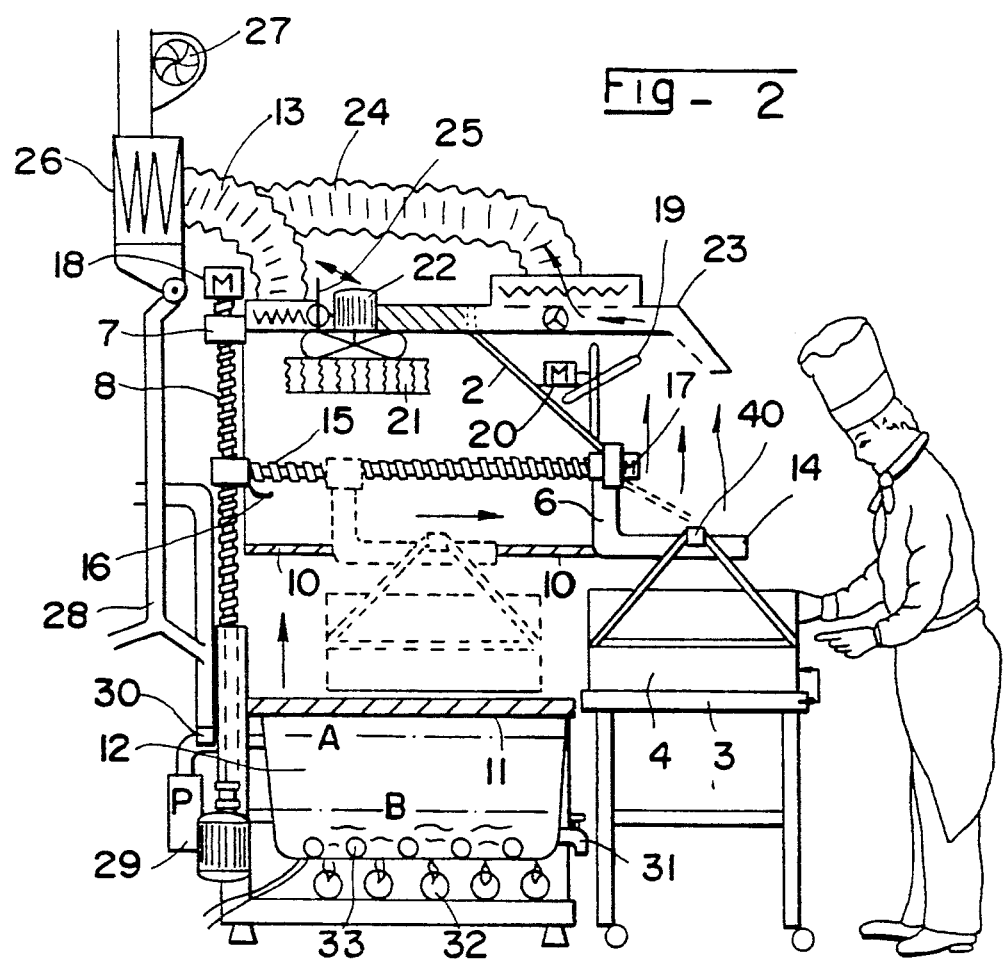
FIG. 2 represents a side view and a section of the cooking device, with the cover lifted and the robot arms removing the basket of products.

FIG. 2 illustrates the basket 4 being removed from the vat 12 and placed on the conveyor 3 by the robot arm 6 by means of fork 14. The robot arm 6 slides on an endless screw 15, and a switch 16 stops the operation of the robot arm 6, which was activated by its motor 17.

The hood-cover 2 is raised and lowered by a raising and lowering on ramp 7, by means of an endless screw 8 and its motor 18.

A guillotine or tilting door 19, motorized 20 or not, permits the passage of the robot arm 6 so that it can take or put the basket 4 on the conveyor 3. The switch 40 signals the presence of the basket.

Above the conveyor 3, a filtering hood 23 connected by conduit 24 up to the extraction sheath 13 recovers the vapors from the products exiting from cooking. A control key 25 controls the exit of the flowing vapor.

A condenser exchanger 26 recovers the vapor condensation which is aspirated towards the outside by the ventilator 27. The condensation waters are evacuated towards the exterior 28, or are returned to the cooking vat 12.

The joints 10 of the hood-cover and 11 of the vat 12 join the two parts hermetically.

A pump 29 recycles the water from the vat 12 at overflow level A, for water immersion cooking, and an overflow level B controls the level of the water in flowing vapor cooking. The regulation and level of the water are controlled by an electrovalve 30.

A faucet 31 permits total evacuation of the water in the vat. The gas burners 32 or electric sheaths 33 permit the vat 12 to be heated.

In FIG. 3, the cooking device is in the closed position, and joints 10 and 11 of the hood-cover 2 and the vat 12 are perfectly joined. The motorized pump 29 recycles the water from the vat 12, while a basket 4 is in the process of cooking. In FIG. 4, the device is closed and cooled, using $CO_2$ gas 34, the lower 35 and upper 36 ventilation turbines circulating the cold air. In this figure, the raising and lowering of the hood-cover 2 occurs by a chain 8 controlled by an electric drive 37, or on a winder 38. The device is surrounded by insulation 39.

In FIG. 5, the cold device is open by a switch 40 the robot arm 6 seizes the basket 4, and motorized by motor 17, slides on endless screw 15. A sliding skirt 41 prevents the loss of cold, allowing the basket 4'' which has not finished its treatment time to continue to cool because the robot arm 6' has not received the information to seize it through its switch. Refrigeration in the device in this figure occurs by a compressor 42 and evaporator 43. Turbines 44 and 45 recycle the cold through the evaporator 43.

On the conveyor 3, a basket waits to be introduced, while another is removed.

Figure 6:
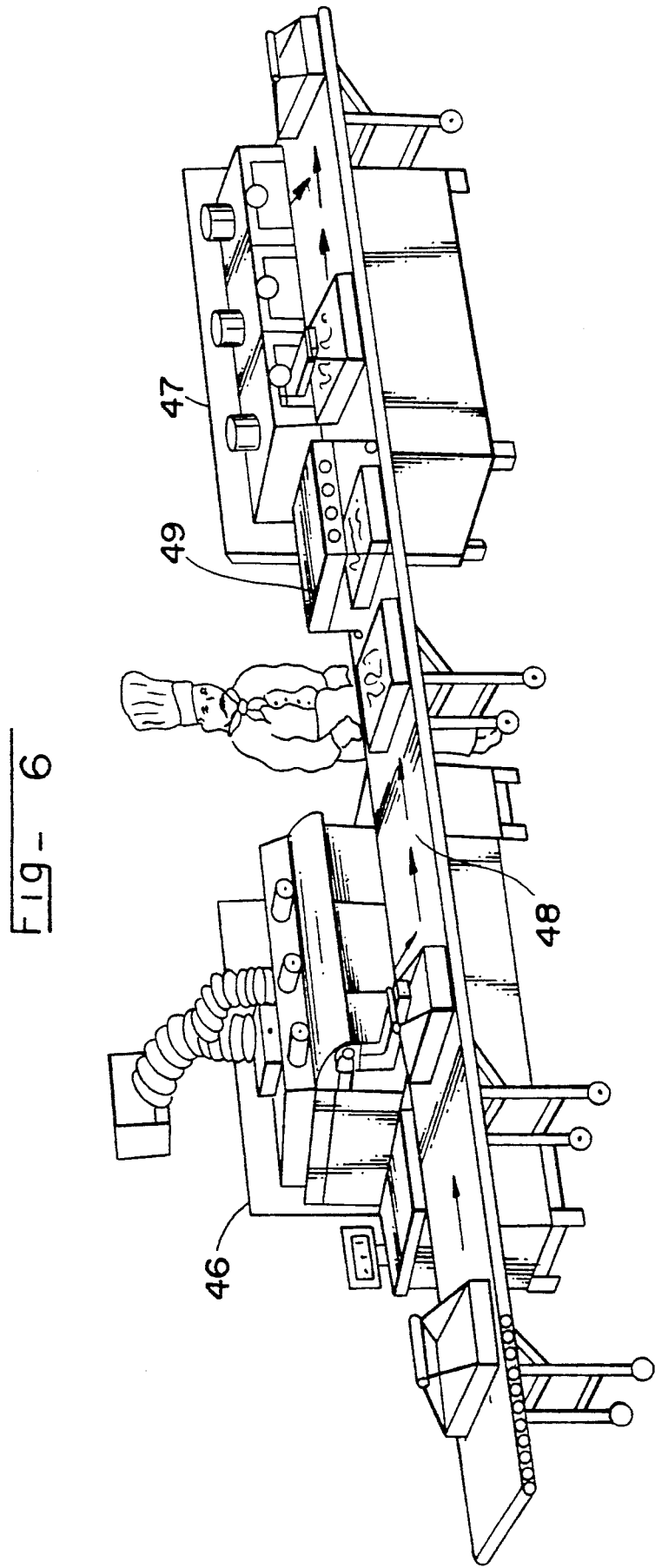
FIG. 6 represents a production line composed of a cooking module and a cooling module with a common conveyor, where a salamander grill sprinkles the products before they are subjected to the refrigeration treatment.

In FIG. 6, two modules for cooking 46 and refrigeration 47 and a common conveyor 48 form a continuous production line. The salamander grill 49 sprinkles the products before they are introduced into the cooling device.

What is claimed:

1. Apparatus for cooking and cooling foods with autonomous introduction and removal of baskets containing a product to be treated, comprising:
   (a) at least one lower part forming at least one treatment zone, said at least one treatment zone being capable of receiving several baskets of products to be treated, one after another;
   (b) at least one hood-cover fitted to overhang said at least one lower part in a contiguous manner;
   (c) means for raising and lowering said at least one hood-cover between a lower position in which said at least one hood-cover covers said at least one lower part, and an upper position which permits introduction of baskets into said at least one treatment zone or removal of baskets from said at least one treatment zone;
   (d) robot arms for moving baskets into and out of said at least one treatment zone, with each of said robot arms being provided with means for grasping a basket;
   (e) means for selectively guiding and moving each of said robot arms, with said means for selectively guiding and moving being integrated with said at least one hood-cover to ensure shifting of each of said robot arms between a position in which said means for grasping a basket can selectively grasp a basket, when the at least one hood-cover is in the lower position, to a position in which a basket can be selectively located outside said at least one treatment zone.

2. The apparatus according to claim 1, wherein said means for raising and lowering said at least one hood-cover include an endless screw, and a motor for driving said endless screw.

3. The apparatus according to claim 1, wherein said means for raising and lowering said at least one hood-cover include a chain controlled by a winder or an electric drive.

4. The apparatus according to claim 1, wherein said means for selectively guiding and moving each of said robot arms include an endless screw.

5. The apparatus according to claim 1, further including a conveyor located outside said at least one treatment zone, from which said means for grasping a basket can grasp a basket for placing in said at least one treatment zone, and to which said means for grasping a basket places a basket after treatment.

6. The apparatus according to claim 4, further including a conveyor located outside said at least one treatment zone, from which said means for grasping a basket can grasp a basket for placing in said at least one treatment zone, and to which said means for grasping a basket places a basket after treatment.

7. The apparatus according to claim 1, wherein said at least one treatment zone includes several vats.

8. The apparatus according to claim 7, wherein each said means for grasping include at least one fork and a switch, said switch being activatable to permit grasping and removal of each basket from a vat as a function of a predetermined length of treatment of its content which is independent of removal of a basket from another vat.

9. The apparatus according to claim 1, including two lower parts forming two treatment zones and two hood-covers, one of said two treatment zones being for cooking and the other of said two treatment zone being for cooling, and a common conveyor forming a continuous production line allowing for cooking and immediate cooling.

10. The apparatus according to claim 9, further including a salamander grill located adjacent said common conveyor between said two treatment zones, so as to permit sprinkling of products exiting from the cooking treatment zone before being introduced into the cooling treatment zone.

11. The apparatus according to claim 1, further including two joints on said at least one hood-cover and a periphery of said at least one lower part, respectively, permitting said at least one hood-cover and said at least one lower part hermetically joined when in the lower position.

12. The apparatus according to claim 1, wherein said at least one hood-cover includes a peripheral skirt capable of sliding to thereby permit introduction or removal of baskets into said at least one treatment zone, whereby heat or cold may be conserved.

13. The apparatus according to claim 1, further including means for controlling a level of liquid in said at least one treatment zone.

14. The apparatus according to claim 7, further including means for controlling a level of liquid in said vats.

15. The apparatus according to claim 1, further including means for venting said at least one hood-cover.

16. The apparatus according to claim 15, further including means for condensing water in association with said means for venting.

17. The apparatus according to claim 16, further including means for draining condensed water externally of said at least one treatment zone.

18. The apparatus according to claim 16, further including means for recycling condensed water to said at least one treatment zone.

19. The apparatus according to claim 1, further including means for recycling liquid in said at least one treatment zone.

* * * * *